(12) United States Patent
Akihisa

(10) Patent No.: US 11,024,895 B2
(45) Date of Patent: Jun. 1, 2021

(54) CHARGING APPARATUS FOR LITHIUM-ION SECONDARY BATTERY AND METHOD FOR CHARGING AND DISCHARGING LITHIUM-ION SECONDARY BATTERY

(71) Applicant: Toyota Jidosha Kabushiki Kaisha, Toyota (JP)

(72) Inventor: Daisuke Akihisa, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/161,783

(22) Filed: Oct. 16, 2018

(65) Prior Publication Data

US 2019/0115633 A1 Apr. 18, 2019

(30) Foreign Application Priority Data

Oct. 17, 2017 (JP) .............................. JP2017-201192

(51) Int. Cl.
*H01M 4/13* (2010.01)
*H01M 10/44* (2006.01)
*H02J 7/00* (2006.01)
*H01M 10/0525* (2010.01)
*H01M 50/463* (2021.01)
*H01M 4/02* (2006.01)

(52) U.S. Cl.
CPC ........... *H01M 10/446* (2013.01); *H01M 4/13* (2013.01); *H01M 10/0525* (2013.01); *H01M 10/44* (2013.01); *H01M 10/443* (2013.01); *H01M 50/463* (2021.01); *H02J 7/0013* (2013.01); *H01M 2004/021* (2013.01); *H01M 2004/025* (2013.01)

(58) Field of Classification Search
CPC .. H01M 10/446; H01M 10/44; H01M 10/443; H01M 2/18; H01M 4/13; H01M 2004/021; H01M 2004/025; H02J 7/0013
See application file for complete search history.

(56) References Cited

U.S. PATENT DOCUMENTS

| 5,436,548 | A | 7/1995 | Thomas | |
|---|---|---|---|---|
| 9,831,528 | B2 * | 11/2017 | Tsubouchi | ........ H01M 10/0525 |
| 2001/0031238 | A1 * | 10/2001 | Omaru | ...................... D01F 9/15 |
| | | | | 423/447.2 |
| 2004/0000892 | A1 | 1/2004 | Jae-Seung | |

(Continued)

FOREIGN PATENT DOCUMENTS

| JP | H08503807 A | 4/1996 |
|---|---|---|
| JP | H08265986 A | 10/1996 |

(Continued)

*Primary Examiner* — Raymond Alejandro
(74) *Attorney, Agent, or Firm* — Dinsmore & Shohl LLP

(57) ABSTRACT

A charging apparatus for a lithium-ion secondary battery in which a cathode, an anode, and an electrolyte are housed in a battery case, includes an electrode shape changing unit that physically changes the shape of at least one electrode of the cathode and the anode at the time of charging or discharging the lithium-ion secondary battery so as to expand at least a part of a void which is formed in the electrode and which is to be penetrated by the electrolyte, and restores the physically changed shape of the electrode after charging or discharging the lithium-ion secondary battery.

8 Claims, 8 Drawing Sheets

(56) References Cited

U.S. PATENT DOCUMENTS

2013/0202781 A1* 8/2013 Kobayashi ........... H01M 4/0411
427/58
2015/0243962 A1 8/2015 Hiroki et al.
2020/0020990 A1* 1/2020 Oba ..................... H01M 10/44

FOREIGN PATENT DOCUMENTS

| JP | 2004-032977 A | 1/2004 |
| JP | 2015-232930 A | 12/2015 |
| JP | 2016-027542 A | 2/2016 |
| JP | 2017-027727 A | 2/2017 |

* cited by examiner

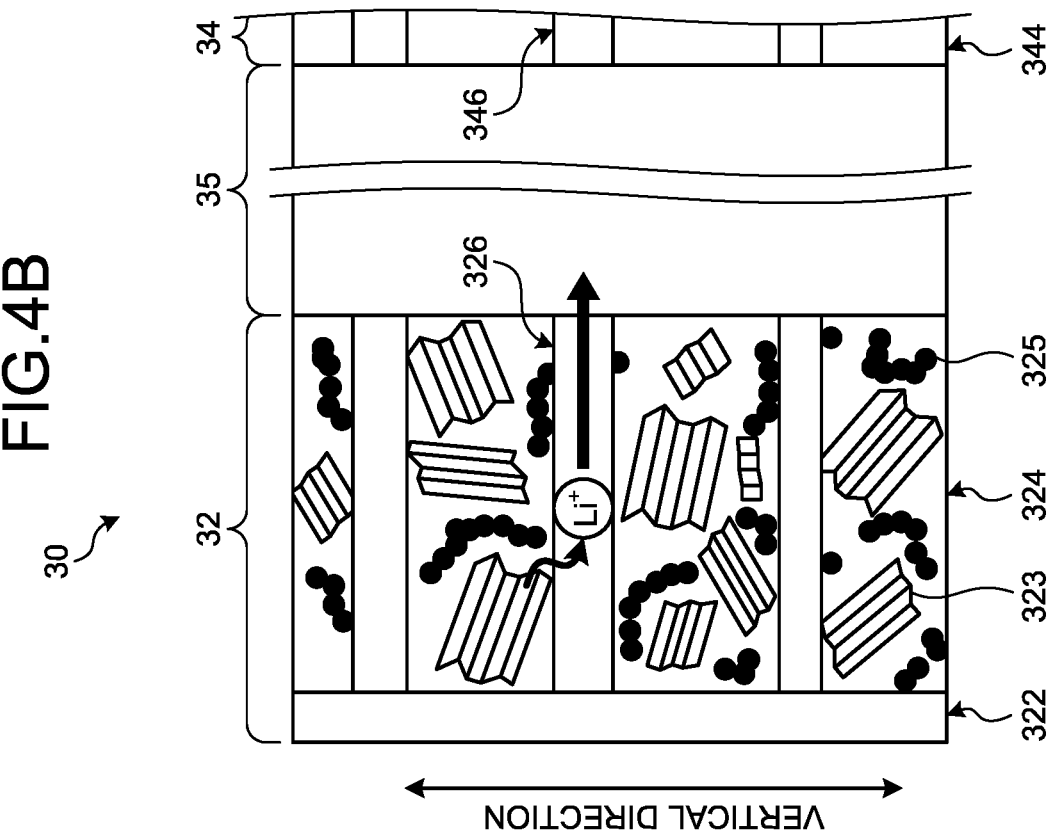
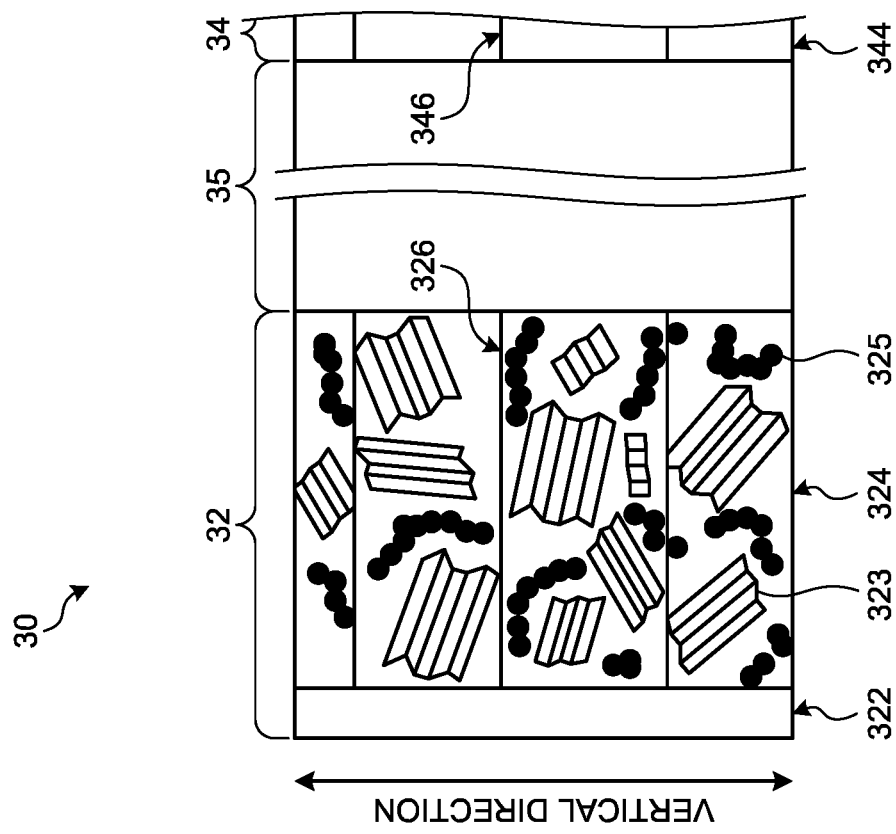

CHARGING APPARATUS FOR LITHIUM-ION SECONDARY BATTERY AND METHOD FOR CHARGING AND DISCHARGING LITHIUM-ION SECONDARY BATTERY

CROSS-REFERENCE TO RELATED APPLICATION(S)

The present application claims priority to and incorporates by reference the entire contents of Japanese Patent Application No. 2017-201192 filed in Japan on Oct. 17, 2017.

BACKGROUND

The present disclosure relates to a charging apparatus for a lithium-ion secondary battery and a method for charging and discharging a lithium-ion secondary battery.

Japanese Laid-open Patent Publication No. 2015-232930 A discloses a lithium-ion secondary battery which is used for, for example, a power source to be mounted on a vehicle and in which an electrode unit and an electrolyte are housed in a battery case. In the electrode unit, a cathode including a cathode active material layer formed on a cathode current collector and an anode including an anode active material layer formed on an anode current collector are laminated with a separator interposed therebetween and wound. The cathode active material layer, the anode active material layer, and the separator are all porous, and internal voids formed therein are impregnated with the electrolyte. Lithium ions pan between the cathode active material layer and the anode active material layer through the electrolyte so as to charge and discharge the lithium-ion secondary battery.

In a lithium-ion secondary battery, by increasing porosity of a cathode active material layer and an anode active material layer, it becomes possible to reduce transfer resistance of lithium ions and enhance a charging rate. However, the more the porosity increases, the less become amounts of a cathode active material and an anode active material included in the cathode active material layer and the anode active material layer, respectively. Accordingly, an increase of the porosity causes a reduction in amount of lithium ions transferring between the cathode active material layer and the anode active material layer, which leads to decrease charge capacity. However, in a case where the cathode active material layer and the anode active material layer are made thicker to ensure adequate amounts of the cathode active material and the anode active material which have been reduced due to an increase in porosity, the transfer resistance of the lithium ions increases, thereby resulting in a reduction of the charging rate. Moreover, in discharging the lithium-ion secondary battery, an increase in porosity and a decrease in transfer resistance of the lithium ions may cause abnormal discharge, in which an excessive current may continuously flow.

SUMMARY

There is a need for providing a charging apparatus for a lithium-ion secondary battery and a method for charging and discharging a secondary battery, which are capable of optimizing transfer resistance and charge capacity of lithium ions.

According to an embodiment of the present disclosure, a charging apparatus for a lithium-ion secondary battery, in which a cathode, an anode, and an electrolyte are housed in a battery case, includes an electrode shape changing unit that physically changes the shape of at least one electrode of the cathode and the anode at the time of charging or discharging the lithium-ion secondary battery so as to expand at least a part of a void which is formed in the electrode and which is to be penetrated by the electrolyte, and restores the physically changed shape of the electrode after charging or discharging the lithium-ion secondary battery.

According to an embodiment of the present disclosure, a method for charging and discharging a lithium-ion secondary battery, in which a cathode, an anode, and an electrolyte are housed in a battery case, includes: a step of changing electrode shape in which at least one electrode of the cathode and the anode is physically changed in shape at the time of charging or discharging the lithium-ion secondary battery to as to expand at least a part of a void which is formed in the electrode and which is to be penetrated by the electrolyte; and a step of restoring electrode shape in which the physically changed shape of the electrode is restored after charging or discharging the lithium-ion secondary battery.

BRIEF DESCRIPTION OF THE DRAWINGS

FIG. 4A is an enlarged view of the electrode unit in a normal state;

FIG. 4B is an enlarged view of the electrode unit whose shape is physically changed;

Figure 5:
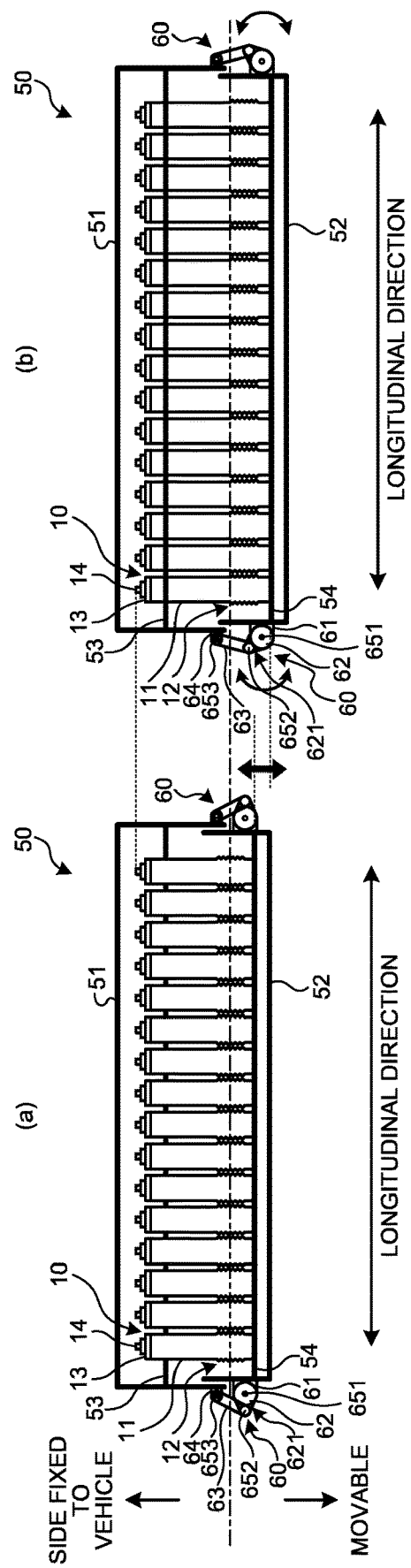
Figure 6:
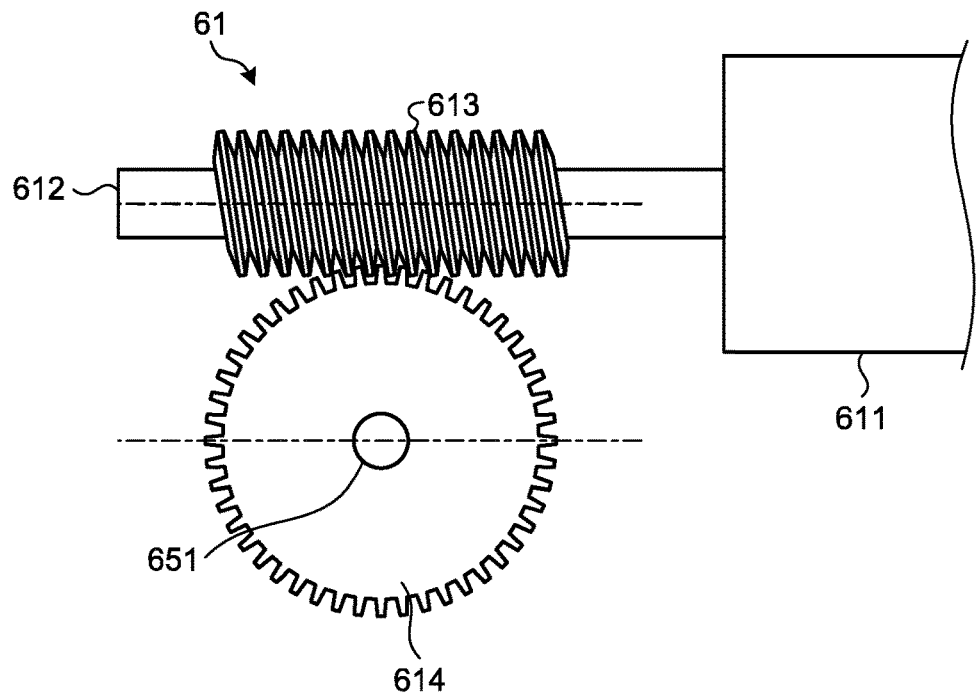
Figure 7A:
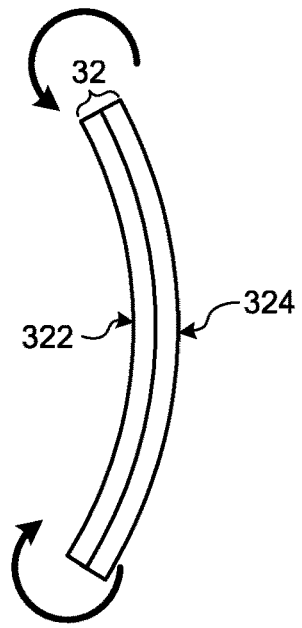
Figure 7B:
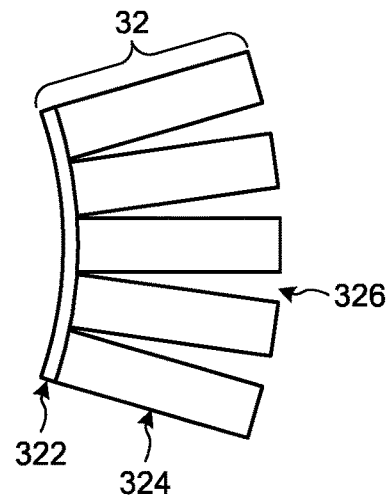
Figure 8:
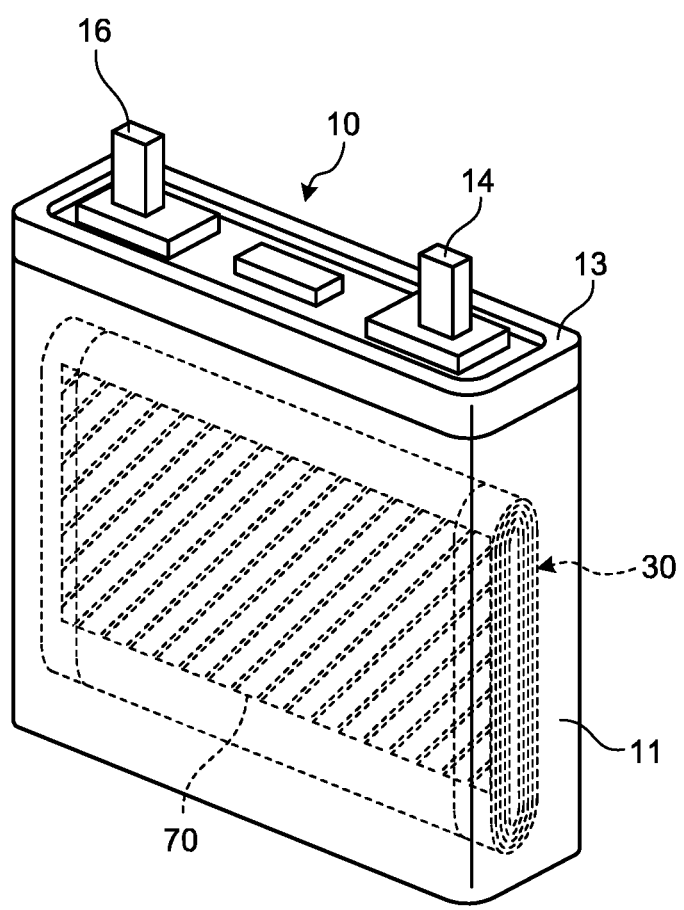
Figure 9:
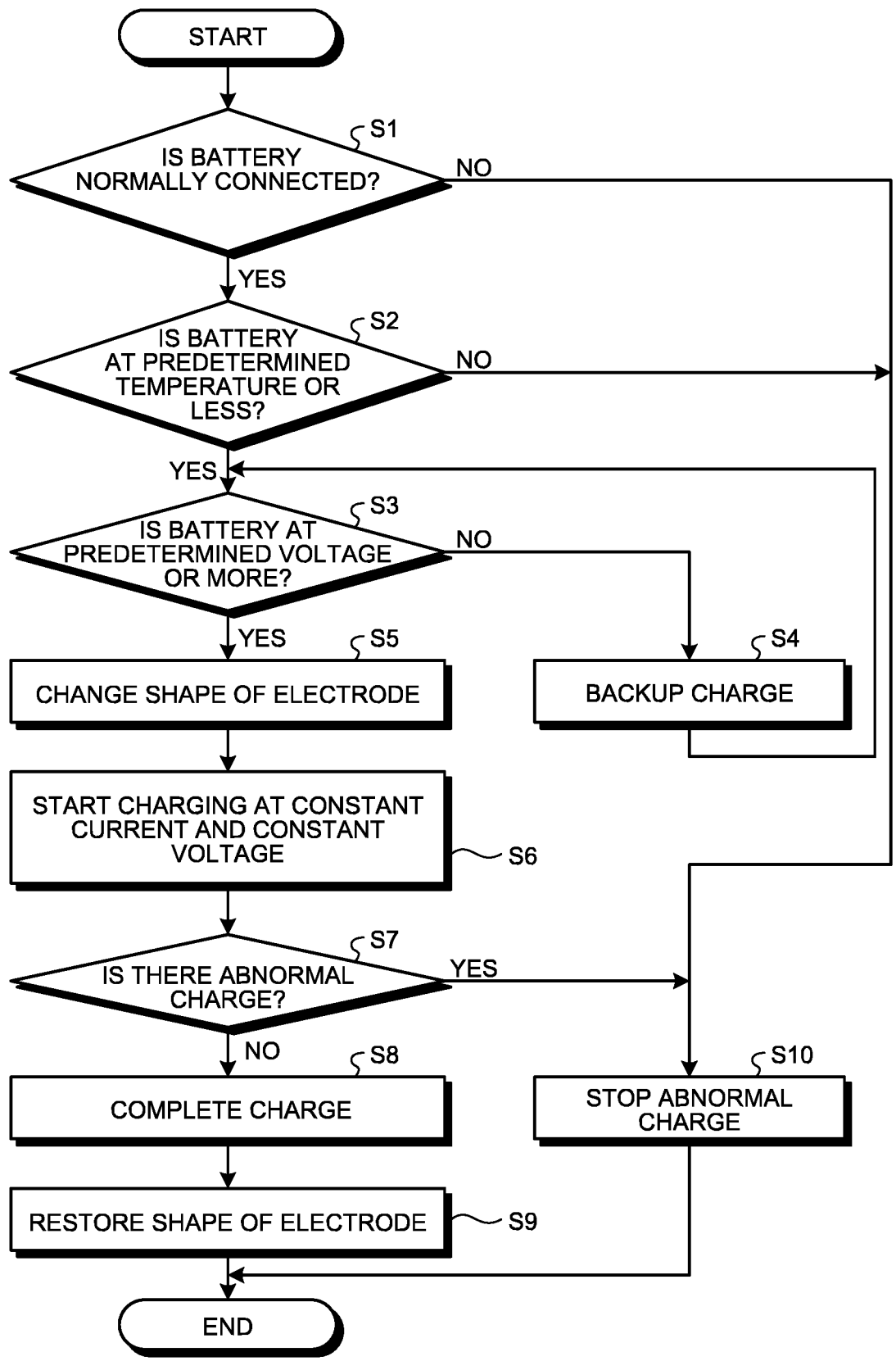

Part (a) of FIG. 5 is a view illustrating a state of a battery module in a normal state;

Part (b) of FIG. 5 is a view illustrating a state of the battery module at the time of charge;

FIG. 6 is a schematic view of a drive unit in a cam mechanism;

FIG. 7A is a view of a cathode sheet which is bent;

FIG. 7B is an enlarged view of the bent cathode sheet;

FIG. 8 is a view illustrating an example configuration of the lithium-ion secondary battery provided with a high-frequency diaphragm that vibrates the electrode unit; and FIG. 9 is a flowchart illustrating example charge control of the lithium-ion secondary battery according to this embodiment.

DETAILED DESCRIPTION

Hereinafter described is an embodiment of a charging apparatus for a lithium-ion secondary battery to which the present disclosure is applied. It should be noted that the present disclosure is not limited to this embodiment.

Figure 1:
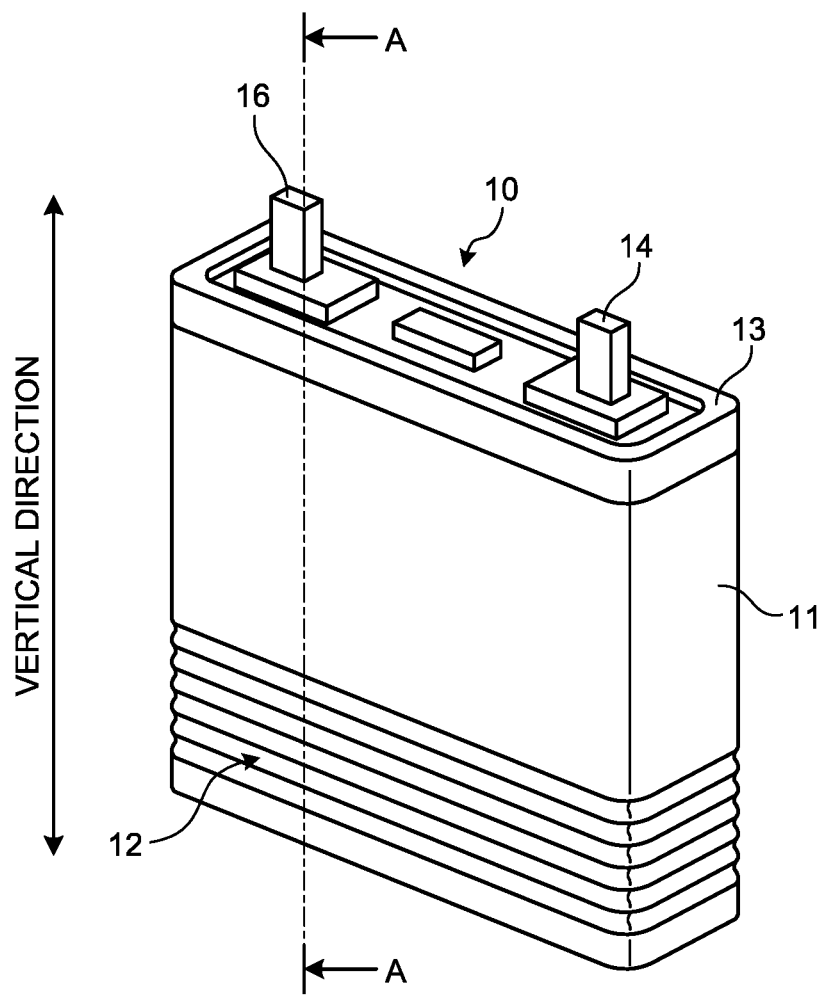
FIG. 1 is a schematic perspective view of a lithium-ion secondary battery according to an embodiment.
Figure 2A:
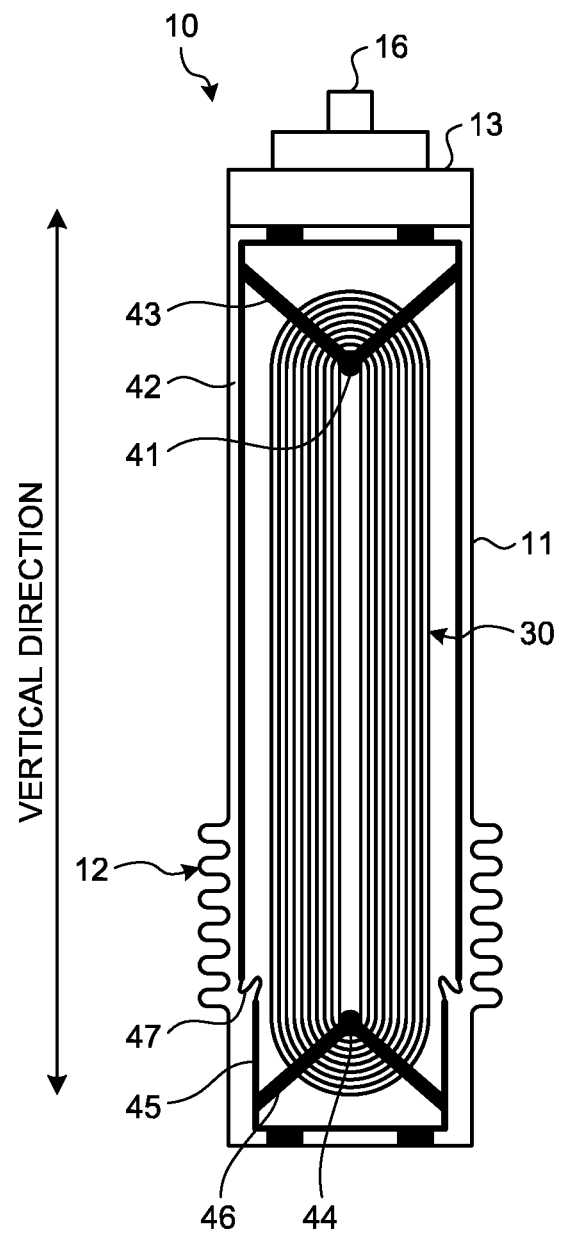
FIG. 2A is a cross-sectional view taken along line A-A of the lithium-ion secondary battery of FIG. 1.
Figure 2B:
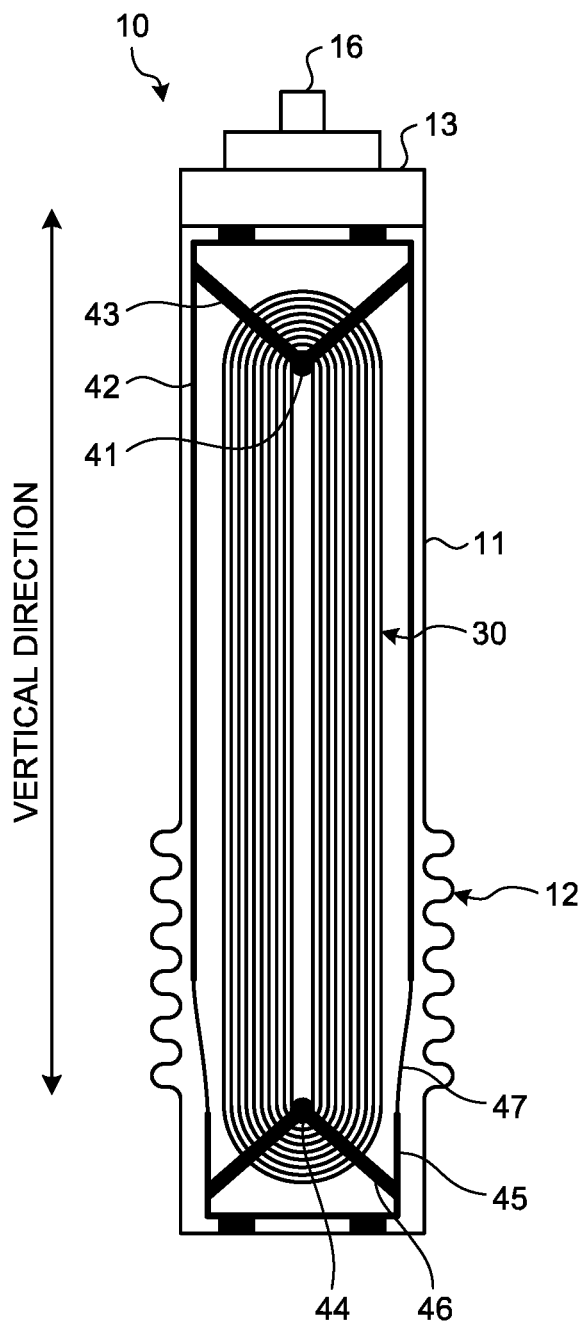
FIG. 2B is a cross-sectional view of the lithium-ion secondary battery elongated in a vertical direction.
Figure 3:
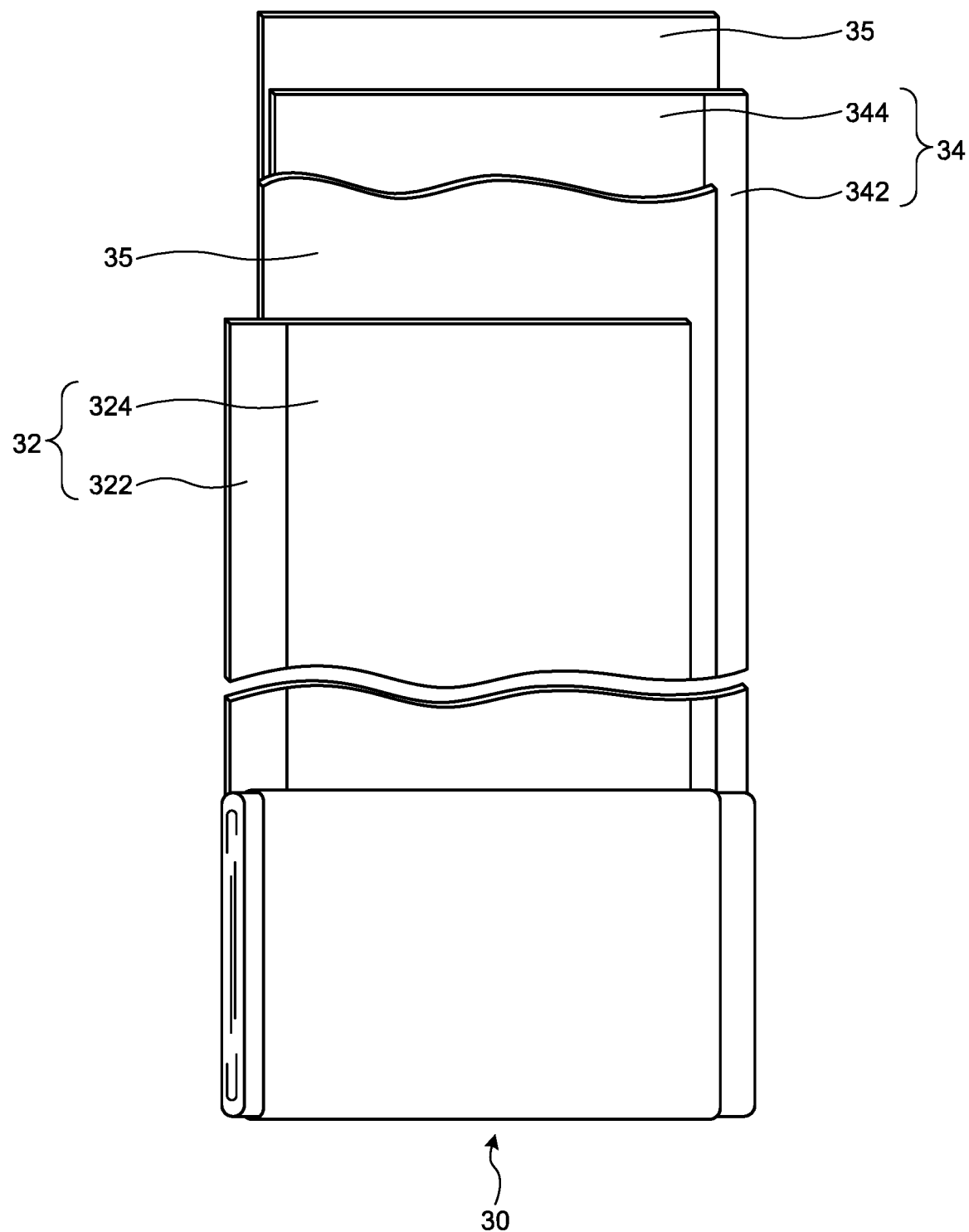
FIG. 3 is a schematic view illustrating an example configuration of an electrode unit.

FIG. 1 is a schematic perspective view of a lithium-ion secondary battery 10 according to an embodiment. FIG. 2A is a cross-sectional view taken along line A-A of the lithium-ion secondary battery 10 of FIG. 1. FIG. 2B is a cross-sectional view of the lithium-ion secondary battery 10 elongated in a vertical direction. FIG. 3 is a schematic view illustrating an example configuration of an electrode unit 30. As illustrated in FIGS. 1 to 3, the lithium-ion secondary battery 10 according to this embodiment includes, for example, a battery case 11, a cover 13, a cathode terminal 14, an anode terminal 16, an electrode unit 30, an unillustrated electrolyte.

The battery case 11 has a box shape with an upper surface provided with an opening and accommodates the electrode unit 30 and the electrolyte. In addition, a part of a lower side wall of the battery case 11 is provided with an accordion stretchable structure 12 in which peaks and troughs are provided alternately, and the battery case 11 is stretchable in the vertical direction. The cover 13 is attached to the battery case 11 so as to close the opening.

The electrode unit 30 includes a cathode sheet 32, serving as a cathode, and an anode sheet 34, serving as an anode, which are wound flatly with a separator sheet 35 intervening therebetween as illustrated in FIG. 3, so that the cathode sheet 32 and the anode sheet 34 are bridged between an upper support shaft 41 and a lower support shaft 44 provided inside the battery case 11 as illustrated in FIGS. 2A and 23. The upper support shaft 41 is supported by an upper support frame 42 fixed to the upper side of the battery case 11 via an upper stay 43. The lower support shaft 44 is supported by a lower support frame 45 fixed to the lower side of the battery case 11 via a lower stay 46. In addition, the upper support frame 42 and the lower support frame 45 are connected via a flexible sheet-like coupling member 47.

The cathode sheet 32 includes an elongated sheet-like cathode current collector 322 having stretchability, and a cathode active material layer 324 formed on the cathode current collector 322. Examples of a material of the cathode current collector 322 include aluminum and an aluminum alloy. The cathode active material layer 324 includes a cathode active material 323 (see FIGS. 4A and 4B), a conductive additive 325 such as carbon black (see FIGS. 4A and 4B), and a binder that binds the cathode active material 323, the conductive additive 325, and the like. Examples of the cathode active material 323 include lithium nickel oxide ($LiNiO_2$), lithium cobalt oxide ($LiCoO_2$), and lithium manganese oxide ($LiMn_2O_4$).

The anode sheet 34 includes an elongated sheet-like anode current collector 342 having stretchability, and an anode active material layer 344 formed on the anode current collector 342. Examples of a material of the anode current collector 342 include copper and a copper alloy. The anode active material layer 344 includes an anode active material, a conductive additive such as carbon black, and a binder that binds the anode active material, the conductive additive, and the like. An example of the anode active material includes graphite.

An example of the separator sheet 35 includes an elongated sheet-like porous organic film having stretchability.

The cathode active material layer 324, the anode active material layer 344, and the separator sheet 35 are impregnated with the electrolyte having a predetermined lithium concentration so that lithium ions pass between the two electrodes through the electrolyte. One end of the cathode terminal 14 is connected to the cathode sheet 32 in the battery case 11, and the other end thereof is exposed to the outside of the cover 13. One end of the anode terminal 16 is connected to the anode sheet 34 in the battery case 11, and the other end thereof is exposed to the outside of the cover 13.

FIG. 4A is an enlarged view of the electrode unit in a normal state. FIG. 4B is an enlarged view of the electrode unit whose shape is physically changed. As illustrated in FIG. 4A, the cathode active material layer 324 of the cathode sheet 32 and the anode active material layer 344 of the anode sheet 34 are provided with a plurality of slits 326 and 346, respectively, at predetermined intervals in the vertical direction of the battery case 11. In the normal state where the lithium-ion secondary battery 10 is not charged, each of the slits 326 and 346 of the cathode active material layer 324 and the anode active material layer 344 are closed.

As illustrated in FIG. 4B, by stretching the cathode sheet 32 and the anode sheet 34 in the vertical direction of the battery case 11, the cathode active material layer 324 and the anode active material layer 344 are elongated in the vertical direction of the battery case 11. This expands a width of each of the slits 326 and 346 of the cathode active material layer 324 and the anode active material layer 344 and forma a plurality of minute voids in the cathode active material layer 324 and the anode active material layer 344.

As the electrolyte penetrates into the plurality of minute voids formed in this manner, the cathode active material layer 324 and the anode active material layer 344 are formed with a transfer pathway of lithium ions consisting of the electrolyte that has transfer resistance smaller than that in other regions. Accordingly, the lithium ions present in the cathode active material 323 of the cathode active material layer 324 can pass along the transfer pathway formed in the cathode active material layer 324 toward the anode active material layer 344 through the separator sheet 35. The lithium ions having transferred to the anode active material layer 344 pass along the transfer pathway formed in the anode active material layer 344 and are captured by the anode active material. In such manners, due to transfer of the lithium ions between the cathode active material layer 324 and the anode active material layer 344 through the transfer pathways formed in the cathode active material layer 324 and the anode active material layer 344, the charging rare of the lithium-ion secondary battery 10 can be enhanced.

Next, an example is described of a method of physically changing the shapes of the cathode sheet 32 and the anode sheet 34 in the lithium-ion secondary battery 10 by stretching those sheets with reference to a battery module 50 mounted on a vehicle.

Part (a) of FIG. 5 is a view of the battery nodule 50 in a normal state. Part (b) of FIG. 5 is a view of the battery module 50 in charging. FIG. 6 is a schematic view of a drive unit 61 in a cam mechanism 60. As illustrated in part (a) of FIG. 5, in the battery module 50, the plurality of lithium-ion secondary batteries 10 are arranged side by side in a longitudinal direction of the battery module 50. The battery module 50 includes an upper holding case 51 which is fixed relative to the vehicle and a lower holding case 52 which is movable relative to a vehicle in the vertical direction of the vehicle. A width of the upper holding case 51 in the longitudinal direction is wider than a width of the lower holding case 52 in the longitudinal direction, and a lower end of the upper holding case 51 overlaps with an upper end of the lower holding case 52 in the longitudinal direction. The upper holding case 51 supports an upper part of each lithium-ion secondary battery 10 with an upper support member 53. The lower holding case 52 supports a lower part of each lithium-ion secondary battery 10 with a lower support member 54.

Both sides of the battery module 50 in the longitudinal direction are provided with the can mechanism 60 that allows the lower holding case 52 to transfer in the vertical direction relative to the upper holding case 51 and that functions as an electrode stretching mechanism that stretches the cathode sheet 32 and the anode sheet 34. The cam mechanism 60 is included in the charging apparatus for the lithium-ion secondary battery 10 according to this embodiment. The cam mechanism 60 includes a drive unit 61, a cam member 62, a link member 63, a link member support unit 64, and the like. The drive unit 61 is attached to an outer surface of the lower holding case 52 in the longitudinal direction. As illustrated in FIG. 6, the drive unit 61 includes a motor 611 serving as a drive source, a worm gear 613 provided on an output shaft 612 of the motor 611, a worm wheel 614 meshing with the worm gear 613, and a first rotary shaft 651 provided with the worm wheel 614 at one end. Furthermore, the cam member 62 is provided at the other end of the first rotary shaft 651. Via a second rotary shaft 652, one end of the link member 63 is rotatably supported by a long shaft 621 which is farthest from the first rotary shaft 651 of the cam member 62 in a radial direction. Via a third rotary shaft 653, the other end of the link member 63 is rotatably supported by the link member support unit 64 provided on the outer surface of the upper holding case 51 in the longitudinal direction.

In the battery module 50, in the normal state where the lithium-ion secondary battery 10 is not being charged, the long shaft 621 of the can member 62 is positioned substantially just beside the first rotary shaft 651 in the radial direction, and the lower holding case 52 comes closest to the upper holding case 51. From the normal state to the time of charging the lithium-ion secondary battery 10, an electric power is supplied to the motor 611, and a rotary drive force output from the output shaft 612 of the motor 611 is transmitted to the first rotary shaft 651 through the worm gear 613 and the worm wheel 614, and the cam member 62 is rotated by a predetermined angle so that the long shaft 621 of the cam member 62 transfers upward. Accordingly, the lower holding case 52 transfers downward via the link member 63 so as to move away from the upper holding case 51. When the cam member 62 is rotated by the predetermined angle, the power supply to the motor 611 is stopped, and the motor 611 stops rotating to stop the rotation of the cam member 62. Therefore, the cam member 62 is held in the position at that time.

In this manner, transferring the lower holding case 52 downward relative to the upper holding case 51 elongates the stretchable structure 12 in the battery case 11 of the lithium-ion secondary battery 10 so that the battery case 11 is elongated downward. Accordingly, the cathode sheet 32 and the anode sheet 34 of the electrode unit 30, extended between the upper support shaft 41 and the lower support shaft 44 inside the battery case 11, are stretched downward, and the cathode sheet 32 and the anode sheet 34 are physically changed in shape so as to expand the width of each of the slits 326 and 346 in the cathode active material layer 324 and the anode active material layer 344.

Upon completion of the charge, an electric power is supplied to the motor 611, and the rotary drive force output from the output shaft 612 of the motor 611 is transmitted to the first rotary shaft 651 through the worm gear 613 and the worm wheel 614, and the cam member 62 is rotated by the predetermined angle so that the long shaft 621 of the cam member 62 transfers substantially just beside the first rotary shaft 651. Accordingly, the lower holding case 52 transfers upward via the link member 63 so as to approach the upper holding case 51. When the cam member 62 is rotated by the predetermined angle, the power supply to the motor 611 is stopped, and the motor 611 stops rotating to stop the rotation of the cam member 62. Therefore, the cam member 62 is held in the position at that time.

In this manner, by transferring the lower holding case 52 upward relative to the upper holding case 51, the stretchable structure 12 in the battery case 11 of the lithium-ion secondary battery 10 contracts so that the shape of the battery case 11 restores to the normal state. Accordingly, the shapes of the cathode sheet 32 and the anode sheet 34 of the electrode unit 30 extended by the upper support shaft 41 and the lower support shaft 44 inside the battery case 11 are restored to the original state.

The method of physically changing the shapes of the cathode sheet 32 and the anode sheet 34 is not limited to the method of stretching the cathode sheet 32 and the anode sheet 34. That is, a mechanism for bending the cathode sheet 32 and the anode sheet 34 may be provided, and the shapes of the cathode sheet 32 and the anode sheet 34 may be physically changed by being bent by that mechanism. In this case, the battery case 11 that houses the cathode sheet 32 and the anode sheet 34 may include a flexible resin material, or the like.

FIG. 7A is a view of the cathode sheet 32 which is bent. FIG. 7B is an enlarged view of the bent cathode sheet 32. For example, in the cathode sheet 32, bending the cathode sheet 32 as illustrated in FIG. 7A to form protrusions in the side closer to the cathode active material layer 324 physically changes the shape of the cathode sheet 32 so that the width of each slit 326 in the cathode active material layer 324 expands as illustrated in FIG. 7B.

FIG. 8 is a view illustrating an example configuration of the lithium-ion secondary battery 10 provided with a high-frequency diaphragm 70 that vibrates the electrode unit 30. As illustrated in FIG. 8, the high-frequency diaphragm 70 may be provided in contact with the electrode unit 30, and in charging, the shapes of the cathode sheet 32 and the anode sheet 34 may be physically changed as the high-frequency diaphragm 70 is turned on to control the shapes by applying vibration to the cathode sheet 32 and the anode sheet 34. In addition, the shapes of the cathode sheet 32 and the anode sheet 34 may be physically changed by shape control due to heat input, using a shape memory alloy in the cathode current collector 322 and the anode current collector 342.

FIG. 9 is a flowchart illustrating an example of charge control of the lithium-ion secondary battery 10 according to this embodiment. It should be noted that the charge control is carried out by, for example, an electronic control device provided in a vehicle on which the lithium-ion secondary battery 10 is mounted. Hereinafter described is a case where the lithium-ion secondary battery 10 is charged from a charging facility installed outside the vehicle via a connection plug. By, for example, detecting whether the connection plug of the charging facility is connected to the vehicle, the electronic control device starts charge control of the lithium-ion secondary battery 10.

First, the electronic control device determines whether the cathode terminal 14 and the anode terminal 16 of the lithium-ion secondary battery 10 are normally connected to respective connection terminals in the vehicle (step S1). Upon determining that the cathode terminal 14 and the anode terminal 16 are not normally connected to the connection terminals (No in step S1), the electronic control device performs an abnormal charge stop process (step S10) and ends a series of charge control. On the other hand, upon determining that the cathode terminal 14 and the anode terminal 16 are normally connected to the connection terminals (Yes in step S1), the electronic control device determines, based on a detection result of a temperature sensor, whether the lithium-ion secondary battery 10 is at a predetermined temperature or less (step S2). Upon determining that the temperature of the lithium-ion secondary battery 10 is more than the predetermined temperature (No in step S2), the electronic control device performs the abnormal charge stop process (step S10) and ends the series of charge control.

On the other hand, upon determining that the temperature of the lithium-ion secondary battery 10 is equal to or less than the predetermined temperature (Yes in step S2), the electronic control device determines, based on a detection result by a voltmeter, whether the lithium-ion secondary battery 10 is at a predetermined voltage or more (step S3). Upon determining that the voltage of the lithium-ion secondary battery 10 is less than the predetermined voltage (No in step S3), the electronic control device performs backup charge (step S4) and sets the voltage of the lithium-ion secondary battery 10 equal to or more than the predetermined voltage. On the other hand, upon determining that the voltage of the lithium-ion secondary battery 10 is equal to or more than the predetermined voltage (Yes in step S3), the electronic control device causes an electrode shape changing unit including the cam mechanism 60 and the silts 326 and 346 to change the shape of at least one electrode of the cathode sheet 32 and the anode sheet 34 in the lithium-ion secondary battery 10 (step S5). Then, the electronic control device starts charging the lithium-ion secondary battery 10 at a constant current and a constant voltage (step S6). When an abnormal charge occurs such as abnormal current value, abnormal temperature, and abnormal charging time during the charge, (Yes in step S7), the electronic control device performs the abnormal charge stop process (step S10) and ends the series of charge control. On the other hand, when there is no abnormal charge occurred (No in step S7) and the lithium-ion secondary battery 10 is charged up to predetermined charge capacity, the electronic control device cuts the power supply from the charging facility and ends the charge (step S8). Upon completion of the charge, the electronic control device causes the electrode shape changing unit to restore the shape of the electrode to the original shape (step S9) and ends the series of charge control.

In this embodiment, although the case is described where the shapes of both the cathode sheet 32 and the anode sheet 34 are physically changed in charging the lithium-ion secondary battery 10, the present disclosure is not limited thereto. That is, it should be noted that the present disclosure can be achieved when at least one electrode of the cathode sheet 32 and the anode sheet 34 is physically changed in shape at the time of charging the lithium-ion secondary battery 10 so as to expand at least a part of the voids which are formed in the electrode and which are to be penetrated by the electrolyte, and the shape of the electrode is restored after the charge.

Furthermore, at least one electrode of the cathode sheet 32 and the anode sheet 34 may be physically changed in shape at the time of discharging the lithium-ion secondary battery 10 so as to expand at least a part of the voids which are formed in the electrode and which are to be penetrated by the electrolyte, and the physically changed shape of the electrode may be restored after the discharge. Accordingly, when there is abnormal discharge, for example, when excessive currents continuously flow from the lithium-ion secondary battery 10, by restoring the physically changed shape of the electrode to enhance the transfer resistance of the lithium ions, it becomes possible to control the abnormal discharge.

In addition, the electrode unit 30 may have a cylindrical shape in which the cathode sheet 32 and the anode sheet 34 may be superposed with the separator sheet 35 interposed therebetween and wound cylindrically around an axis.

In a charging apparatus for a lithium-ion secondary battery and a method for charging and discharging a lithium-ion secondary battery according to the present disclosure, the shape of an electrode is physically changed at the time of charge or discharge, and then, the shape is restored after the charges or discharge so that at least a part of a void formed in the electrode is expanded and restored. This makes it possible to reduce transfer resistance of lithium ions or to enhance the transfer resistance of the lithium ions without reducing an amount of an active material of the electrodes. Therefore, it is possible to achieve the effect of optimizing the transfer resistance and charge capacity of the lithium ions.

According to an embodiment, the electrode shape changing unit may include an electrode stretching mechanism to stretch at least one electrode of the cathode and the anode to expand at least a part of the void.

Accordingly, by stretching the electrode with the electrode stretching mechanism, the electrode is elongated, which causes an expansion of at least a part of the void which is formed in the electrode and which is to be penetrated by the electrolyte.

According to an embodiment, the electrode shape changing unit may include an electrode bending mechanism to bend at least one electrode of the cathode and the anode to expand at least a part of the void.

Accordingly, by bending the electrode with the electrode bending mechanism, at least a part of the void can be expanded, which is forced in the electrode and which is to be penetrated by the electrolyte.

According to an embodiment, the electrode shape changing unit may include a high-frequency vibration merrier to vibrate at least one electrode of the cathode and the anode to expand at least a part of the void.

Accordingly, by applying vibration the electrodes with the high-frequency vibration member, at least a part of the void can be expanded, which is formed in the electrode and which is to be penetrated by the electrolyte.

According to on embodiment, the cathode and the anode include respective active material layers, and a plurality of slits at a predetermined interval may be provided at least one of the active material layers of the cathode and the anode.

Accordingly, by forming a minute void in the active material layer to form a transfer pathway of lithium ions consisting of the electrolyte, transfer resistance of the lithium ions can be reduced.

According to an embodiment, in the step of changing electrode shape, at least one electrode of the cathode and the anode may be stretched so as to change the shape of the electrode.

Accordingly, it becomes possible to elongate the electrode to expand at least a part of the void which is formed, in the electrode and which is to be penetrated by the electrolyte.

According to an embodiment, in the step of changing electrode shape, at least one electrode of the cathode and the anode may be bent so as to change the shape of the electrode.

Accordingly, by bending the electrode, it becomes possible to expand at least a part of the void which is formed in the electrode and which is to be penetrated by the electrolyte.

According to an embodiment, in the step of changing electrode shape, at least one electrode of the cathode and the anode may be vibrated at high frequency so as to change the shape of the electrode.

Accordingly, by vibrating the electrode, it becomes possible to expand at least a part of the void which is formed in the electrode and which is to be penetrated by the electrolyte.

According to an embodiment, in the step of changing electrode shape, a width of a plurality of slits provided at a predetermined interval in an active material layer included in the at least one electrode may be expanded so as to change the shape of the electrode.

Accordingly, it becomes possible to form a minute void in the active material layer to form a transfer pathway of lithium ions consisting of the electrolyte and reduce transfer resistance of the lithium ions.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging apparatus for a lithium-ion secondary battery in which a cathode, an anode, and an electrolyte are housed in a battery case, the charging apparatus comprising:
   an electrode shape changing unit configured to physically change a shape of at least one of the cathode and the anode at the time of charging or discharging the lithium-ion secondary battery so as to expand at least a part of a void which is formed in the at least one of the cathode and the anode and which is to be penetrated by the electrolyte, and restore the physically changed shape of the at least one of the cathode and the anode after charging or discharging the lithium-ion secondary battery,
   wherein the cathode includes a cathode current collector, having an elongated sheet shape and stretchability, and a cathode active material layer, formed on the cathode current collector, having a cathode active material,
   the anode includes an anode current collector, having an elongated sheet shape and stretchability, and an anode active material layer, formed on the anode current collector, having an anode active material,
   a plurality of slits are formed at a predetermined interval in at least one of the cathode active material layer and the anode active material layer corresponding to the at least one of the cathode and the anode, and
   a width of the plurality of slits changes in accordance with the physical change of the shape of at least one of the cathode and the anode by the electrode shape changing unit.

2. The charging apparatus for a lithium-ion secondary battery according to claim 1, wherein the electrode shape changing unit includes an electrode stretching mechanism configured to stretch at least one of the cathode and the anode to expand at least the part of the void.

3. The charging apparatus for a lithium-ion secondary battery according to claim 1, wherein the electrode shape changing unit includes an electrode bending mechanism configured to bend at least one of the cathode and the anode to expand at least the part of the void.

4. The charging apparatus for a lithium-ion secondary battery according to claim 1, wherein the electrode shape changing unit includes a vibration member configured to vibrate the cathode and the anode to expand at least the part of the void.

5. A method for charging and discharging a lithium-ion secondary battery in which a cathode, an anode, and an electrolyte are housed in a battery case, the method including:
   a step of changing electrode shape, by an electrode shape changing unit, in which a shape of at least one of the cathode and the anode is physically changed at the time of charging or discharging the lithium-ion secondary battery so as to expand at least a part of a void which is formed in the at least one of the cathode and the anode and which is to be penetrated by the electrolyte; and
   a step of restoring electrode shape, by the electrode shape changing unit, in which the physically changed shape of the at least of the cathode and the anode is restored after charging or discharging the lithium-ion secondary battery,
   wherein a plurality of slits are formed at a predetermined interval in at least one of a cathode active material layer and an anode active material layer corresponding to the at least one of the cathode and the anode, a width of the plurality of slits changes in accordance with the physical change of the shape of at least one of the cathode and the anode by the electrode shape changing unit,
   wherein the cathode includes a cathode current collector, having an elongated sheet shape and stretchability, and the cathode active material layer, formed on the cathode current collector having the cathode active material,
   wherein the anode includes an anode current collector, having an elongated sheet shape and stretchability, and the anode active material layer, formed on the anode current collector having the anode active material.

6. The method for charging and discharging a lithium-ion secondary battery according to claim 5, wherein in the step of changing electrode shape, at least one of the cathode and the anode is stretched, by an electrode stretching mechanism, so as to expand at least the part of the void.

7. The method for charging and discharging a lithium-ion secondary battery according to claim 5, wherein in the step of changing electrode shape, at least one of the cathode and the anode is bent, by an electrode bending mechanism, so to expand at least the part of the void.

8. The method for charging and discharging a lithium-ion secondary battery according to claim 5, wherein in the step of changing electrode shape, at least one of the cathode and the anode is vibrated, by a vibration member, so as to expand at least the part of the void.

* * * * *